United States Patent
Lee

(10) Patent No.: US 8,625,026 B2
(45) Date of Patent: Jan. 7, 2014

(54) APPARATUS AND METHOD FOR DETECTING VIDEO FILM WITH MIX MODE

(75) Inventor: Tung-Hsin Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 153 days.

(21) Appl. No.: 13/244,286

(22) Filed: Sep. 24, 2011

(65) Prior Publication Data
US 2012/0212667 A1  Aug. 23, 2012

(30) Foreign Application Priority Data
Feb. 18, 2011  (TW) .............................. 100105501 A

(51) Int. Cl.
*H04N 7/01*  (2006.01)
(52) U.S. Cl.
USPC .............. 348/452; 348/700; 348/701; 348/97
(58) Field of Classification Search
USPC ..................................... 348/452, 97, 700, 701
See application file for complete search history.

(56) References Cited

U.S. PATENT DOCUMENTS

| 2005/0249282 A1* | 11/2005 | Landsiedel et al. ...... 375/240.12 |
| 2008/0106642 A1* | 5/2008 | Srinivasan et al. ............ 348/452 |
| 2009/0256958 A1* | 10/2009 | Chao ............................. 348/452 |

* cited by examiner

*Primary Examiner* — Jefferey Harold
*Assistant Examiner* — Omer Khalid
(74) *Attorney, Agent, or Firm* — Jianq Chyun IP Office

(57) ABSTRACT

An apparatus for detecting video film with mix mode is provided. The apparatus includes: a field motion detection unit receiving the field motion value of a current field image or a fed back last field image to detect out at least a motion block; an expanding block unit expanding the motion block into an expanded motion block; a delay unit delaying the received current field image by a predetermined time; an AND processing unit performing an AND processing on the current field image and the last expanded motion block to obtain a confirmed motion block; an inverse telecine (IVTC) unit excluding the confirmed motion block to decide an IVTC mode; a deinterlace unit recovering the continuously input current field image into a video image according to the IVTC mode, wherein the motion block is further recovered with weighted inverse IVTC mode according to a motion intensity value.

10 Claims, 4 Drawing Sheets

APPARATUS AND METHOD FOR DETECTING VIDEO FILM WITH MIX MODE

CROSS-REFERENCE TO RELATED APPLICATION

This application claims the priority benefit of Taiwan application serial no. 100105501, filed on Feb. 18, 2011. The entirety of the above-mentioned patent application is hereby incorporated by reference herein and made a part of this specification.

BACKGROUND OF THE INVENTION

1. Field of the Invention

The invention generally relates to a technology of recovering a playing image to a captured image, and more particularly, to a technology able to process the display mode of an image with a motion block therein.

2. Description of Related Art

Usually, the capturing rate of a video is different from the standardized playing rate. For example, a video capturing rate is 24 Hz, while the usual playing rate according to, for example, NTSC standard, is 60 Hz or 50 Hz for PAL & SECAM standards. Hence, in order to play an originally capturing video compliant with NTSC or PAL & SECAM standard, the captured video needs to be pulled down to that of the playing standard.

For example, to change 24 Hz to 50 Hz of PAL standard, a captured image would be unwoven into two images including an even image and an odd image. It's well known that an even image is formed by a plurality of images extracted from a captured image and belonging to the even scan lines; an odd image is formed by a plurality of images extracted from a captured image and belonging to the odd scan lines. In this way, 24 Hz of the capturing rate can be changed to 50 Hz of the playing rate. In other words, a captured original image would be unwoven according to a selected video pattern following the rate required by a playing standard so as to be played in interlaced way.

On the contrary, if a field image to be played needs to be recovered to its originally captured image, the video pattern thereof must be detected out, followed by recovering it into the originally captured image according to the video pattern.

FIG. 1 is a diagram showing how to convert an image captured with a slower rate into an image with a higher playing rate compliant with a playing standard. Referring to FIG. 1, in order to make an image captured in 24 Hz played in a playing rate close to 50 Hz, an original image 100 would be unwoven into an odd image 102 and an even image 104, wherein the odd image 102 is formed by the images belonging to the odd scan lines in the original image 100 and the even image 104 is formed by the images belonging to the even scan lines in the original image 100. During playing, the unwoven images are woven into the played image, for example, the played image on TV. The above-mentioned deweaving way is just the so-called 2:2 mode, and it can be 2:3 mode or other modes as well. Taking the 2:3 mode as an example, an original image 100 is unwoven into an odd image and an even image, followed by deweaving the next original image 100 into odd/even/odd three images.

In terms of a TV display, when a major playing content is playing at the display area thereof, a motion figure, for example, motion textural information, may overlay the bottom of the screen. FIG. 2 is a diagram of a traditional display method of an image with mix mode. Referring to FIG. 2, a major played dynamic image is displayed in a display screen 120. At the time, if there are other additional dynamic images, for example, motion textural information overlaying on the screen 120, it would cover a data portion of the original image 100 belonging to the area. For example, an original image 122 and a motion caption 124 may be simultaneously displayed.

Usually, the original image 122 and the motion caption 124 come from different sources, and they might be different video play modes. Hence, in order to recover the played image to the original video, it is needed to detect and process the moving motion caption 124 so as to obtain the more correct original image data.

In the prior art, for example, U.S. Patent Application No. 2005/0249282 discloses a scheme that an entire frame is divided into a plurality of blocks and a video mode detection is performed on each of the blocks, and for the blocks with mix mode, the conventional Bob method is used for processing. The scheme basically is a block-based video mode detection by using a block as an unit, which requires a larger storage space, where the motion values are individually saved and the detection result of mix mode is based on block as an unit.

In addition, U.S. Patent Application No. 2009/0256958 discloses a scheme that a square mix mode range is obtained through combining the motion state with the video detection result. However, the mix mode range does not take a pixel as a unit and the mix mode is unhelpful for detecting video. In particular, when the mix mode range is excessive, it may leads to failing of the video detection.

In short, the recover method to process a mix mode video is still in developing.

SUMMARY OF THE INVENTION

Accordingly, the invention is directed to an apparatus and a method for detecting video film with mix mode, which can effectively detect a mix mode area and reduce the effect of the mix mode area on video mode detection.

An embodiment of the invention provides an apparatus for detecting video film with mix mode, which includes a field motion detection unit, a motion block detection unit, an expanding block unit, a delay unit, an AND processing unit, an inverse telecine unit (IVTC unit) and a deinterlace unit (DEI unit). The field motion detection unit receives a current field image and at least an adjacent field image so as to detect out a field motion value of each pixel. The motion block detection unit divides an image into a plurality of un-overlaid blocks, receives the field motion value of the current field image or the field motion value of a fed back last field image so as to detect out the motion state of each block and labels as a motion block. The expanding block unit expands the motion block into an expanded motion block. The delay unit delays the received current field image by a predetermined time and then outputs the delayed current field image to the expanding block unit to become a last field image relative to the next current field image. The AND processing unit takes at least a pixel as an intersection area, performs an AND processing on the current field image with the motion block and the last field image with the expanded motion block to obtain a confirmed motion block and assigns a motion intensity value to the intersection area according to the field motion value. The IVTC unit decides an IVTC mode after excluding the confirmed motion block according to the motion intensity value and the continuously input current field image. The deinterlace unit recovers the continuously input current field image into a video image according to the IVTC mode, wherein the deinterlace unit further recovers the image content of the confirmed motion block with a weighted IVTC mode according to the motion intensity value.

An embodiment of the invention provides a method for detecting video film with mix mode implemented in a plurality of function units in a video recover apparatus. The method includes: receiving a current field image and at least an adjacent field image so as to detect out a field motion value of each pixel; then, deciding whether or not to reload image detection data, wherein if it is to reload image detection data, the field motion value serves as a motion intensity value to be directly output, and if it is not to reload image detection data, the following step continues; checking a possible motion block by performing AND judgement according to the field motion value of the current field image and the field motion value of a fed back last field image and estimating and obtaining the motion intensity value to be output; labeling the motion block according to the current field image; expanding the motion block into an expanded motion block and making the current field image serve as the last field image to be fed back to the step of checking the possible motion block; deciding an IVTC mode after excluding the possible motion block decided according to the motion intensity value in the continuously input current field image; and recovering the continuously input current field image into a video image according to the IVTC mode, wherein the recover processing is further performed with a weighted IVTC mode according to the motion intensity value.

An embodiment of the invention provides a method for detecting video film with mix mode implemented in a plurality of function units in a video recover apparatus. The method includes: receiving a current field image and at least an adjacent field image so as to detect out a field motion value of each pixel; then, receiving the field motion value of the current field image or the field motion value of a fed back last field image so as to detect out at least a motion block and labeling the motion block; expanding the motion block into an expanded motion block; delaying the current field image by a predetermined time to become a last field image relative to the current field image; performing an AND processing, wherein at least a pixel serves as an intersection area, an AND operation is performed on the current field image with the motion block and the last field image with the expanded motion block so as to obtain a confirmed motion block, and a motion intensity value is assigned to the intersection area according to the field motion value; deciding an IVTC mode after excluding the confirmed motion block decided according to the motion intensity value in the continuously input current field image; and performing deinterlace processing so as to recover the continuously input current field image into a video image according to the IVTC mode, wherein the image content of the confirmed motion block is further recovered with a weighted IVTC mode according to the motion intensity value.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In addition to effectively detecting out motion blocks of a dynamic image and more precisely detecting out video play mode, the present invention can more precisely recover the image on the portion of motion blocks as well.

Figure 1:
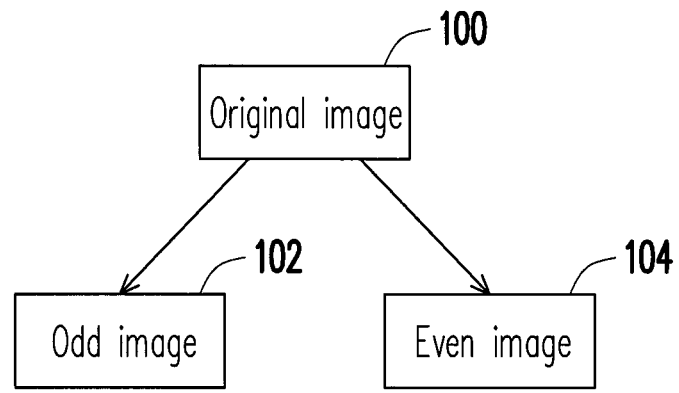
FIG. 1 is a diagram showing how to convert an image captured with a slower rate into an image with a higher playing rate compliant with a playing standard.
Figure 2:
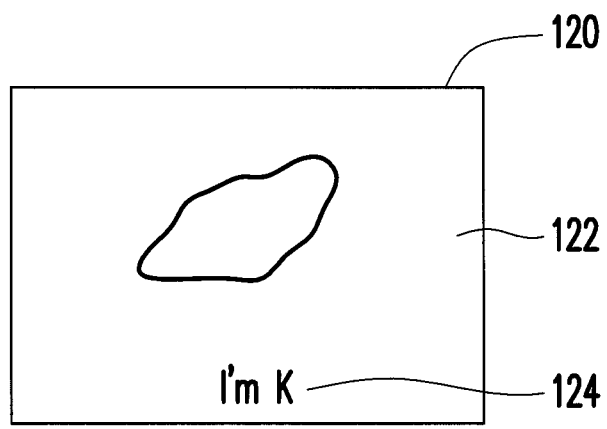
FIG. 2 is a diagram of a traditional display method of an image with mix mode.
Figure 3:
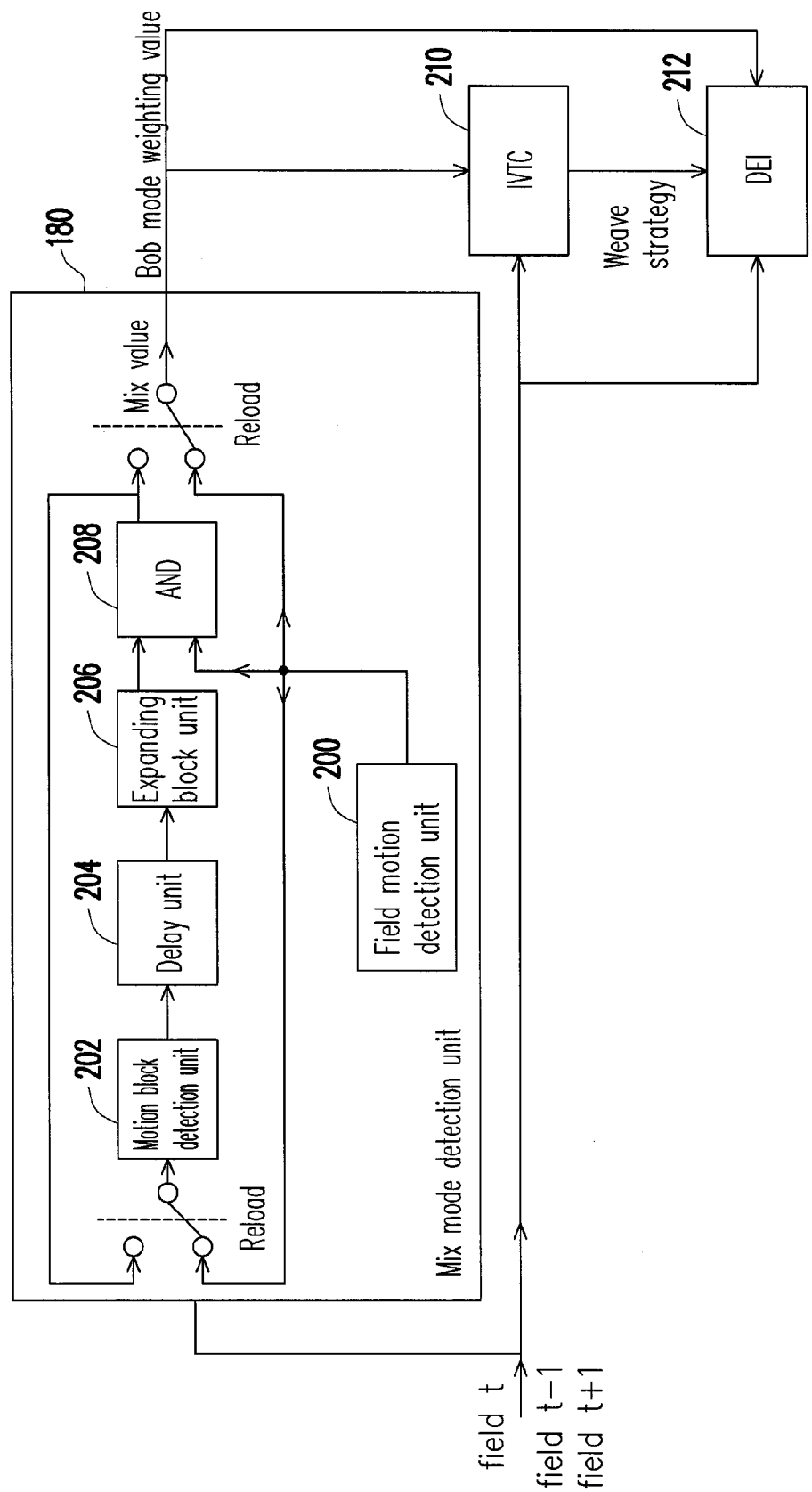
FIG. 3 is a schematic function block chart of an apparatus for detecting video film with mix mode according to an embodiment of the invention.
Figure 4:
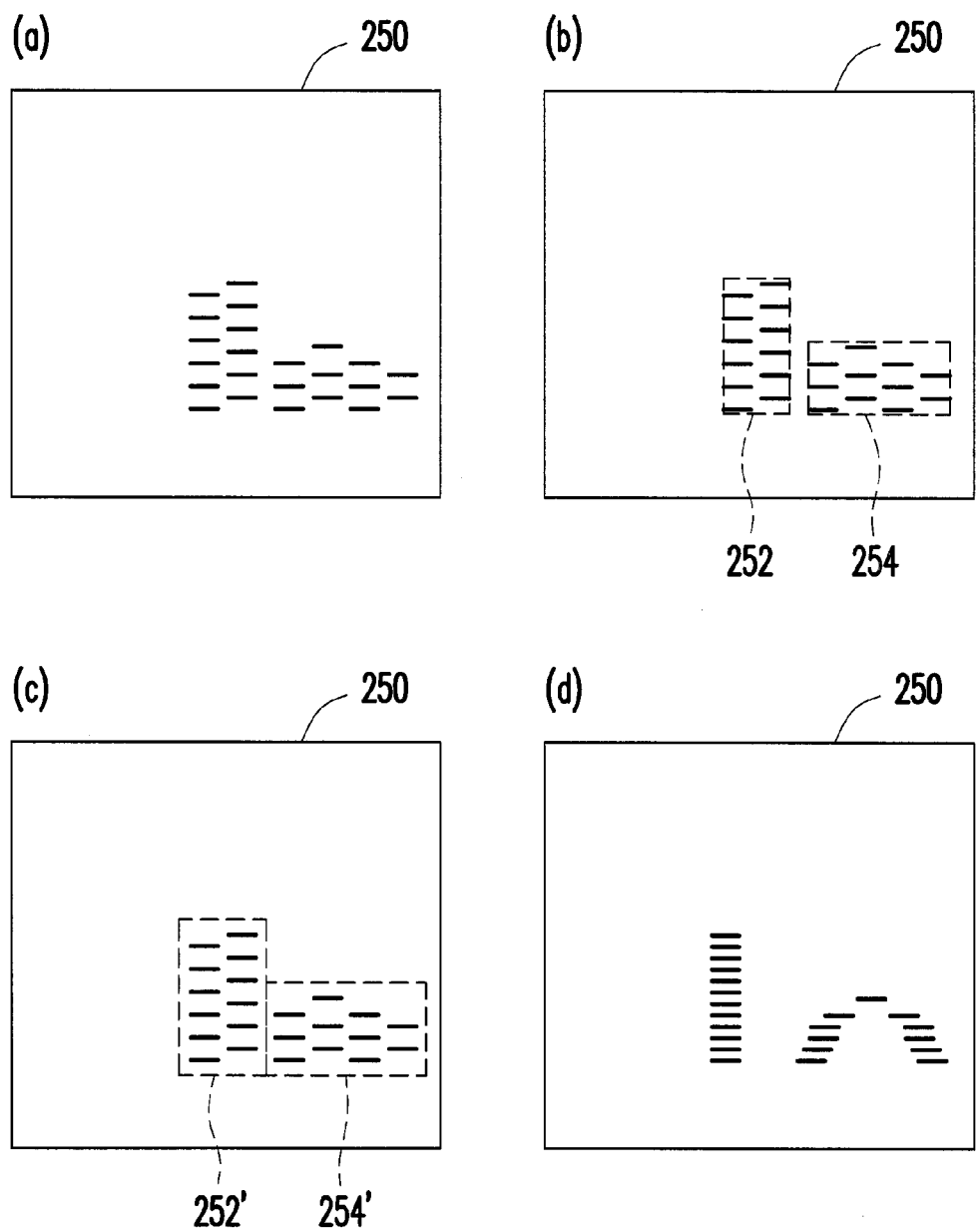
FIG. 4 is four diagrams of a recovered image obtained after the processing by the apparatus for detecting video film with mix mode of FIG. 3 according to an embodiment of the invention.

In following, some embodiments are described to explain the invention, which however the invention is not limited to. FIG. 3 is a schematic function block chart of an apparatus for detecting video film with mix mode according to an embodiment of the invention and FIG. 4 is four diagrams of a recovered image obtained after the processing by the apparatus for detecting video film with mix mode of FIG. 3 according to an embodiment of the invention. Referring to FIG. 3, an apparatus for detecting video film with mix mode includes a field motion detection unit 200, a motion block detection unit 202, a delay unit 204, an expanding block unit 206, an AND processing unit 208, an IVTC unit 210 and a DEI unit 212. A reload switching unit similar to switch is also included to restart a new image data detection in association with the system operation.

The field motion detection unit 200 receives a current field image and at least an adjacent field image so as to detect out a field motion value of each pixel, wherein the current field image is notated with field t, the adjacent field images, for example, a last field image is notated with field t−1 and a next field image is notated with field t+1. An IVTC mechanism in the invention decides selecting the last field image or the next field image, or selecting both the above-mentioned two images for weaving.

In general speaking, when two field images are correctly woven according to the IVTC mechanism, a present field motion is caused often due to a mix mode only. A field motion detection is performed on the two fields according to the weaving direction selected by the IVTC mechanism, wherein a field motion value is calculated out with, for example, the pixel level way. To obtain the field motion value, usually it is decided by checking combing extent. When a motion block is present, after unweaving an image into an odd image and an even image, the image belonging to the motion block would be displaced, referring to FIG. 4(a). At the time, for the pixels of a vertical bar-shape image, it appears in alternate bright/dark look, which is just the well-known combing phenomena. The motion block can be detected out by means of the combing phenomena.

The motion block detection unit 202 executes the above-mentioned operation, which receives the field motion value of a current field image or the field motion value of a fed back last field image so as to detect out at least a motion block and labels the motion block, referring to FIG. 4(b).

The expanding block unit 206 expands the detected out motion block into an expanded motion block.

The delay unit 204 delays the received current field image by a predetermined time and then outputs the delayed current field image to the expanding block unit to become a last field image relative to the next current field image. At the time, the delay unit 204 is mainly used to delay the expanded motion block for performing AND judgement on the delayed expanded motion block and the not expanded yet motion block in the current field image at the next time point. Consequently, the sequence of the operations of the delay unit 204 and the expanding block unit 206 can be interchanged by each other. That is to say, it can be delaying operation followed by expanding operation or expanding operation followed by delaying operation.

The AND processing unit 208 takes at least a pixel as an intersection area, performs an AND processing on the current field image with the motion block and the last field image with the expanded motion block to obtain a confirmed motion block and assigns a motion intensity value to the intersection area according to the field motion value.

The IVTC unit 210 decides an IVTC mode after excluding the confirmed motion block according to the motion intensity value. The DEI unit 212 recovers the continuously input current field image into a video image according to the IVTC mode, wherein the DEI unit further recovers the image content of the confirmed motion block with a weighted IVTC mode according to the motion intensity value.

The mechanism of detecting a motion block is described in more detail as follows. When an image is divided into a plurality of blocks for testing, if a certain amount of pixels in a block is motion pixels, then, the field motion values thereof are recorded and given to the block/blocks, i.e., the motion blocks 252 and 254 in FIG. 4(*b*). The size of a block is M×N, wherein M and N can be a positive integral number. The more the value, the less the space required by the buffer storage component is, but the judgement of mix mode would be more imprecise.

If the field motion comes from a mix mode, then, it is certain that there exist the original field motion values with mix mode. Assuming the mix mode does not move largely, those unlikely having field motion can be excluded by using the feature and the field motion more likely belonging to the mix mode remains. As shown in FIG. 3, the output of the motion block detection unit 202, after being delayed by the delay unit 204, for example, after an one-time vertically synchronizing delay, becomes the last field image relative to the next current field image. The labelled last motion blocks are expanded by the expanding block unit 206. As shown by FIG. 4(*c*), the motion blocks 252 and 254 are expanded into two motion blocks 252' and 254'. At the time, the motion blocks 252' and 254' can be, for example, outwards expanded by a predetermined pixel from the motion values of the pixels at the edges of the motion blocks 252' and 254'. The motion values of the expanded pixels can be set with the maximum value in a surrounding range, for example, a range of 3×3.

After that, the AND processing unit 208 performs an AND processing again on the field motions at the time. That is "whether or not there exists a field motion value near to the last relative position". At last, taking a pixel as a unit, the result after the AND processing serves as a mix value, i.e., a motion intensity value used for recovering the next video. Although in the input of the AND processing unit 208, the expanded block is treated as a unit, but the field motion detection is pixel-based, i.e. a pixel is used as a unit, so that the final mix value is also based on a pixel serving as a unit. If it is necessary, the above-mentioned scheme can be modified that a small quantity of pixels are used as a processing unit.

If both the last field image field t−1 and the next field image field t+1 of a currently processed field image field t come from a same image after an unweaving processing, it is ascertained the field motion comes from the mix mode. At the time, by starting the reload switching unit, the mix value would be directly equal to the motion intensity value, i.e., the output at the right side is switched to take the path at the down side; meanwhile, the reload switching unit at the left side is switched to take the path at the down side as well. In this way, the operation of checking the block position can be paused so as to avoid that a wrongful detection is continuously inherited. When reloading again, the other several units 202, 204, 206 and 208 continuously work to obtain the expanded block used for the next processing of the AND processing unit 208. After reloading, it is switched to the normal operation path at the up side.

If the last field image field t−1 of the currently processed field image field t does not always come from the video image same as that the next field image field t+1 comes from, wherein they are, for example, 2:2 unwoven format, it would be also reloaded one time every other a couple of cycles, which does not entirely depend on the sources of the last field image field t−1 and the next field image field t+1.

The IVTC unit 210 also receives the three field images (the last one, the current one and the next one) and the mix value having a so-called Bob mode weighting value output from the mix mode detection unit 180 and outputs a weave strategy to decide whether the operation strategy of the DEI unit 212 is a recover processing scheme of Bob mode or weave mode. The mix value is just the motion intensity value, which decides the extent biasing Bob mode of the DEI unit 212 during weaving. That is to say, a weighting mechanism is used herein to estimate the information of the original video plus mix mode.

In addition, during the IVTC unit 210 is performing video detection, the mix value can be used to exclude the pixels belonging to mix mode so that the detection of the unweaving way of a video is more precise. After the IVTC unit 210 decides the weave strategy of the DEI unit 212, the mix value has also decided the extent biasing Bob mode of the DEI unit 212 during weaving. A larger mix value means the recover processing can be done directly from the same image without referring to other field images for weaving. At the time, in addition to receiving the last-current-next three images, the DEI unit 212 also receives the weave strategy of the IVTC unit 210 and the Bob mode weighting value output from the mix mode detection unit 180, followed by performing a deinterlace processing.

As shown by FIG. 4(*d*), a more correct motion image data can be obtained at the mix mode area.

Figure 5:
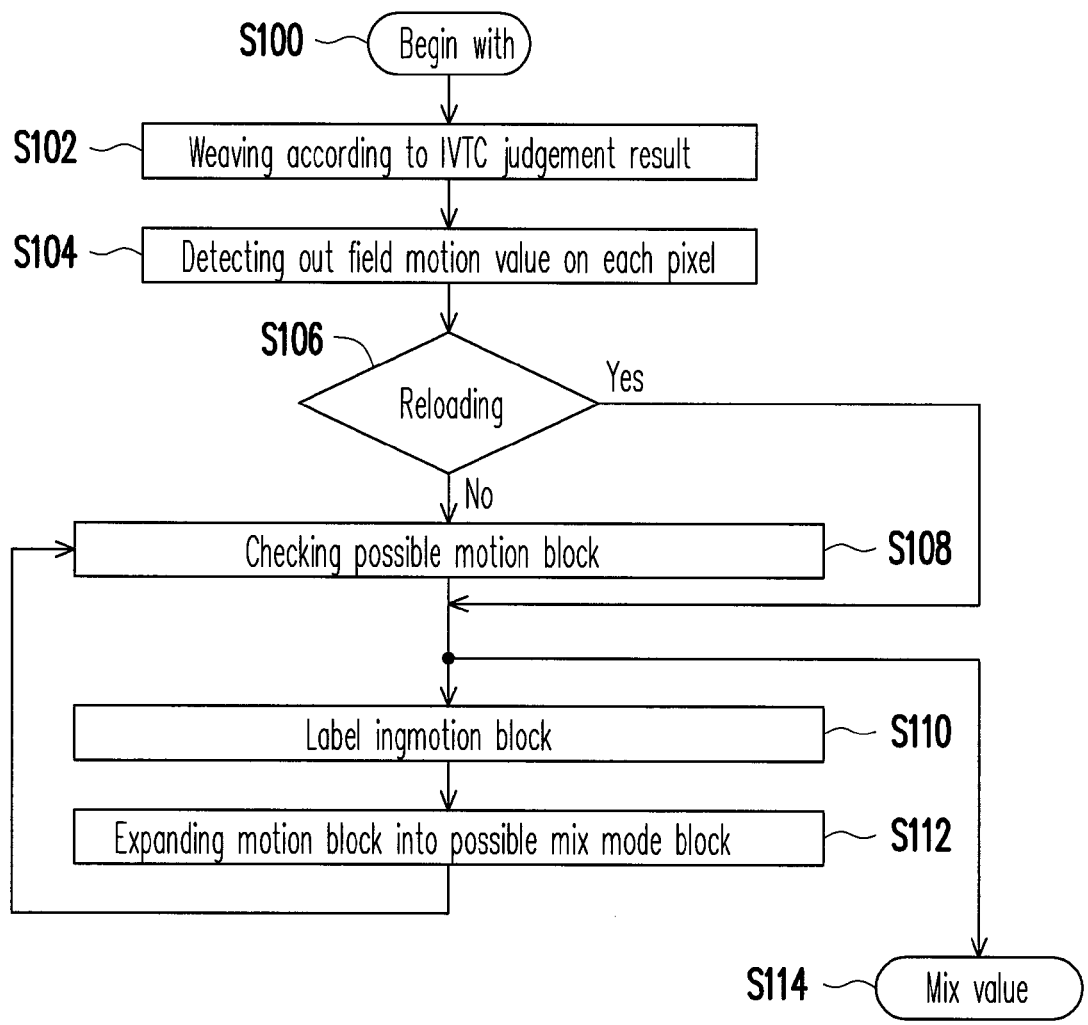
FIG. 5 is a schematic operation block chart of a method for detecting video film with mix mode according to an embodiment of the invention.

The above-mentioned operations of FIG. 3 can be depicted with an operation flow. FIG. 5 is a schematic operation block chart of a method for detecting video film with mix mode according to an embodiment of the invention. Referring to FIG. 5, the operation flow begins with step S100.

At step S102, a weave processing is performed according to the IVTC judgement result so as to detect unweaving mode.

At step S104, a current field image and at least an adjacent field image are received so as to detect a field motion value of each pixel.

At step S106, it is decided whether or not to reload the image detection data. If reload is needed, the operation flow skips step S106 and directly goes to step S114 and a mix value is output; if reload is not needed, the flow directly goes to step S108.

At step S108, a possible motion block is checked, which performs an AND judgement according to the field motion value of the current field image and the field motion value of a fed back last field image, and the mix value obtained by estimating serves as a motion intensity value and is output at step S114.

At step S110, the motion block is labelled according to the current field image.

At step S112, the motion block is expanded to an expanded motion block and the current field image serving as a last field image is fed back to step S108 where a possible motion block is checked.

After ascertaining the mix value and the motion block, the IVTC unit 210 in FIG. 3 is used to exclude the possible motion block according to the mix value so as to decide an IVTC mode.

The DEI unit 212 recovers the continuously input current field image into a video image according to the IVTC mode, wherein the recover processing is further performed with a weighted IVTC mode according to the mix value. The weight is selected to enhance the extent biasing Bob mode under weaving mode.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An apparatus for detecting video film with mix mode, comprising:
    a field motion detection unit, receiving a current field image and at least an adjacent field image so as to detect out a field motion value of each pixel;
    a motion block detection unit, dividing an image into a plurality of un-overlaid blocks, receiving the field motion value of the current field image or the field motion value of a fed back last field image so as to detect out the motion state of each block and labeling as a motion block;
    an expanding block unit, expanding the motion block into an expanded motion block;
    a delay unit, delaying the received current field image by a predetermined time and then outputting the delayed current field image to the expanding block unit to become a last field image relative to the next current field image;
    an AND processing unit, taking at least a pixel as an intersection area, performing an AND processing on the current field image with the motion block and the last field image with the expanded motion block to obtain a confirmed motion block and assigning a motion intensity value to the intersection area according to the field motion value;
    an inverse telecine unit, deciding an inverse telecine mode after excluding the confirmed motion block according to the motion intensity value and the continuously input current field image;
    a deinterlace unit, recovering the continuously input current field image into a video image according to the inverse telecine mode, wherein the deinterlace unit further recovers the image content of the confirmed motion block with a weighted inverse telecine mode according to the motion intensity value; and
    a reload switching unit for, under a set condition, switching the apparatus to a restart path and then switching back to a cycled operation path and executing all of the field motion detection unit, the motion block detection unit, the expanding block unit, the delay unit, the AND processing unit, the inverse telecine unit, and the deinterlace unit.

2. The apparatus for detecting video film with mix mode as claimed in claim 1, wherein the reload switching unit makes an input to the motion block detection unit switched between directly receiving the field motion value of the current field image output from the field motion detection unit and receiving the field motion value of the fed back last field image and correspondingly makes the field motion value of the current field image directly serve as the motion intensity value or the output of the AND processing unit serve as the motion intensity value so as to be output to the inverse telecine unit and the deinterlace unit.

3. The apparatus for detecting video film with mix mode as claimed in claim 1, wherein the expanding block unit makes the motion intensity value of a plurality of pixels of an expanded area in the expanded motion block the same as the maximum motion intensity value among the adjacent pixels.

4. The apparatus for detecting video film with mix mode as claimed in claim 1, wherein the delay unit performs a vertical synchronizing delay.

5. The apparatus for detecting video film with mix mode as claimed in claim 1, wherein the intersection area is a pixel unit so as to perform AND processing on each the pixel and assign the motion intensity value to the intersection area.

6. The apparatus for detecting video film with mix mode as claimed in claim 1, wherein the weighted inverse telecine mode is to perform image weight interpolation processing according to the motion intensity value when the deinterlace unit performs deinterlace processing on the current field image referring to the adjacent two last and next field images.

7. The apparatus for detecting video film with mix mode as claimed in claim 1, wherein the decided inverse telecine mode is Bob inverse telecine mode or interlace inverse telecine mode.

8. A method for detecting video film with mix mode, implemented in a plurality of function units in a video recover apparatus; comprising:
    receiving a current field image and at least an adjacent field image so as to detect out a field motion value of each pixel;
    deciding whether or not to reload image detection data, wherein if the image detection data is to be reloaded, the field motion value serves as a motion intensity value to be directly output; if the image detection data is not to be reloaded, the following steps continue;
    checking a possible motion block by performing AND judgement according to the field motion value of the current field image and the field motion value of a fed back last field image and estimating and obtaining the motion intensity value to be output; labeling the motion block according to the current field image;
    expanding the motion block into an expanded motion block and making the current field image serve as the last field image to be fed back to the step of checking the possible motion block;
    deciding an inverse telecine mode after excluding the possible motion block decided according to the motion intensity value in the continuously input current field image;
    recovering the continuously input current field image into a video image according to the inverse telecine mode, wherein the recover processing is further performed with a weighted inverse telecine mode according to the motion intensity value; and performing a reloading step, wherein in a certain condition, a work flow for detecting video film with mix mode is switched to a restart path and then back to a cycle operation path to execute each of the steps of receiving the current field image, deciding whether or not to reload image detection data, checking the possible motion block by performing AND judgement, expanding the motion block, deciding the inverse telecine mode, and recovering the continuously input current field image.

9. The method for detecting video film with mix mode as claimed in claim 8, wherein if it is to reload image detection data, the method also comprises:

checking a possible motion block by performing AND judgement according to the field motion value of the current field image and the field motion value of a fed back last field mage;

labeling the motion block according to the current field image;

delaying the current field image;

expanding the delayed motion block into an expanded motion block;

checking a possible motion block by performing AND judgement according to the current field image and the expanded motion block.

10. A method for detecting video film with mix mode implemented in a plurality of function units in a video recover apparatus; comprising:

receiving a current field image and at least an adjacent field image so as to detect out a field motion value of each pixel;

receiving the field motion value of the current field image or the field motion value of a fed back last field image so as to detect out at least a motion block and labeling the motion block;

expanding the motion block into an expanded motion block;

delaying the current field image by a predetermined time to become a last field image relative to the current field image;

performing an AND processing, wherein at least a pixel serves as an intersection area, an AND operation is performed on the current field image with the motion block and the last field image with the expanded motion block so as to obtain a confirmed motion block, and a motion intensity value is assigned to the intersection area according to the field motion value;

deciding an inverse telecine mode after excluding the confirmed motion block decided according to the motion intensity value in the continuously input current field image;

performing deinterlace processing so as to recover the continuously input current field image into a video image according to the inverse telecine mode, wherein the image content of the confirmed motion block is further recovered with a weighted inverse telecine mode according to the motion intensity value, and performing a reloading step, wherein in a certain condition, a work flow for detecting video film with mix mode is switched to a restart path, and then back to a cycle operation path to execute each of the steps of receiving the current field image, receiving the field motion value of the current field image, expanding the motion block, delaying the current field image, performing the AND processing, and deciding the inverse telecine mode, and performing deinterlace processing.

* * * * *